US012762117B1

(12) United States Patent
Querel et al.

(10) Patent No.: US 12,762,117 B1
(45) Date of Patent: Oct. 13, 2026

(54) METHODS FOR ASSISTING OPTIMIZATION OF TARGET UNSTRUCTURED LOG DATA PROCESSING AND DEVICES THEREOF

(71) Applicant: F5, Inc., Seattle, WA (US)

(72) Inventors: Laurent Querel, Gilroy, CA (US); Kevin W Baughman, Natick, MA (US); Dmitry M Kit, Marietta, GA (US); Joseph Daniel Baker, Amherst, NH (US)

(73) Assignee: F5, Inc., Seattle, WA (US)

( * ) Notice: Subject to any disclaimer, the term of this patent is extended or adjusted under 35 U.S.C. 154(b) by 53 days.

(21) Appl. No.: 19/046,912

(22) Filed: Feb. 6, 2025

(51) Int. Cl.

| | |
|---|---|
| ***G06F 16/00*** | (2019.01) |
| ***G06F 16/21*** | (2019.01) |
| ***G06F 16/242*** | (2019.01) |

(52) U.S. Cl.
CPC .......... *G06F 16/243* (2019.01); *G06F 16/212* (2019.01)

(58) Field of Classification Search
CPC .. G06F 21/566; G06F 21/552; G06F 16/2358; G06F 21/562; G06F 2221/034; G06F 11/3438; G06F 11/3452; G06F 11/3006; G06F 17/40; G06F 11/3442; G06F 11/0751; G06F 11/3409; G06F 11/3476; G06F 16/212; G06F 11/1471; G06F 9/45558; G06F 16/313; G06F 16/31; G06N 3/09; G06N 3/088; G06N 3/045; G06N 3/044; G06N 3/082; G06N 3/08; G06N 20/20; G06N 3/0442; G06N 3/0455
See application file for complete search history.

(56) References Cited

U.S. PATENT DOCUMENTS

| | | | |
|---|---|---|---|
| 9,292,371 | B1 | 3/2016 | Clifford |
| 10,580,090 | B2 | 3/2020 | Shah |
| 2005/0144189 | A1 | 6/2005 | Edwards |
| 2013/0097426 | A1 | 4/2013 | Agrawal |
| 2013/0312006 | A1 | 11/2013 | Hardman |
| 2014/0196044 | A1 | 7/2014 | Fernando |
| 2016/0057076 | A1 | 2/2016 | Zlati |
| 2018/0293258 | A1* | 10/2018 | Oravivattanakul .......... G06F 16/2455 |
| 2019/0050245 | A1 | 2/2019 | Bhageria |

(Continued)

OTHER PUBLICATIONS https://clouddocs.f5.com/products/extensions/f5-appsvcs-extension/latest/refguide/schema-reference.html.
https://techdocs.f5.com/kb/en-us/products/big-ip_asm/manuals/product/asm-implementations-12-1-0/14.html.
https://techdocs.f5.com/en-us/bigip-15-1-0/big-ip-access-policy-manager-authentication-essentials/logging-and-reporting.html.

*Primary Examiner* — Yicun Wu
(74) *Attorney, Agent, or Firm* — Troutman Pepper Locke LLP

(57) ABSTRACT

Methods, network traffic management apparatuses, non-transitory computer readable media, and systems that assist optimization of unstructured log data processing. The method receives a query from a log processing device configured to process target unstructured log data, retrieves and transmits one or more entries to the log processing device. The retrieved one or more entries are generated based on extracting, from training log data, one or more templates and corresponding parameters, prompting a natural language processing model with the one or more template and parameters of the template, to generate a log type template structure descriptor and a log schema parameter specification, and storing the log type template structure descriptor and the log schema parameter specification as one or more entries in a log catalog storage.

20 Claims, 9 Drawing Sheets

(56) References Cited

U.S. PATENT DOCUMENTS

| | | | | |
|---|---|---|---|---|
| 2020/0159587 | A1 | 5/2020 | Li | |
| 2020/0192899 | A1 | 6/2020 | Joshi | |
| 2020/0342389 | A1 | 10/2020 | Nejad | |
| 2020/0364082 | A1 | 11/2020 | Nejad | |
| 2021/0165776 | A1 | 6/2021 | Nejad | |
| 2021/0374153 | A1* | 12/2021 | Saxena | G06F 16/24 |
| 2022/0214948 | A1* | 7/2022 | Yeddu | G06N 3/09 |
| 2022/0237101 | A1* | 7/2022 | Singh | G06F 11/3438 |
| 2024/0232163 | A1* | 7/2024 | Degirmenci | G06F 21/566 |
| 2024/0378202 | A1* | 11/2024 | Chen | G06F 16/2455 |

* cited by examiner

```
Jun 12 15:20:00 bigip1 notice mcpd[12345]: 01070638:5: AUDIT - user 'admin' -
object 0:0:10 - transaction status: Commit complete
Jun 12 15:21:00 bigip2 info httpd[23145]: 10.0.0.1 - - [12/Jun/2024:15:21:00
+0000] "GET /index.html HTTP/1.1" 200 1234
Jun 12 15:22:00 bigip1 info tmstatsd[12345]: 01071038:6: METRIC - pool
/Common/pool1 - up members 2, down members 0, total members 2
Jun 12 15:23:00 bigip1 notice mcpd[12345]: 01070638:5: AUDIT - user 'guest' -
object 0:0:20 - transaction status: Rollback complete
Jun 12 15:24:00 bigip1 info httpd[12345]: 192.168.1.1 - - [12/Jun/2024:15:24:00
+0000] "POST /login HTTP/1.1" 302 345
Jun 12 15:25:00 bigip1 info tmstatsd[12345]: 01071038:6: METRIC - virtual server
/Common/vs1 - bytes in 1234567, bytes out 7654321
Jun 12 15:26:00 bigip1 notice mcpd[12345]: 01070638:5: AUDIT - user 'admin' -
object 0:0:30 - transaction status: Commit complete
Jun 12 15:27:00 bigip1 info httpd[12345]: 203.0.113.5 - - [12/Jun/2024:15:27:00
+0000] "PUT /api/data HTTP/1.1" 201 567
Jun 12 15:29:00 bigip2 notice mcpd[14545]: 01070638:5: AUDIT - user 'guest' -
object 0:0:40 - transaction status: Commit complete
Jun 12 15:30:00 bigip1 info httpd[12345]: 198.51.100.2 - - [12/Jun/2024:15:30:00
+0000] "DELETE /api/data/12345 HTTP/1.1" 204 0
Jun 12 15:31:00 bigip1 info tmstatsd[12345]: 01071038:6: METRIC - pool
/Common/pool2 - up members 3, down members 1, total members 4
Jun 12 15:32:00 bigip1 notice mcpd[12345]: 01070638:5: AUDIT - user 'admin' -
object 0:0:50 - transaction status: Commit complete
Jun 12 15:33:00 bigip1 info httpd[12345]: 172.16.0.1 - - [12/Jun/2024:15:33:00
+0000] "PATCH /api/user/98765 HTTP/1.1" 200 456
Jun 12 15:34:00 bigip1 info tmstatsd[12345]: 01071038:6: METRIC - virtual server
/Common/vs2 - connections active 100, connections total 1000
```

FIG. 5

```
Jun 12 15:20:00 bigip1 notice mcpd[12345]: 01070638:5: AUDIT - user 'admin' -
object 0:0:10 - transaction status: Commit complete
Jun 12 15:23:00 bigip1 notice mcpd[12345]: 01070638:5: AUDIT - user 'guest' -
object 0:0:20 - transaction status: Rollback complete
Jun 12 15:26:00 bigip1 notice mcpd[12345]: 01070638:5: AUDIT - user 'admin' -
object 0:0:30 - transaction status: Commit complete
Jun 12 15:29:00 bigip2 notice mcpd[14545]: 01070638:5: AUDIT - user 'guest' -
object 0:0:40 - transaction status: Commit complete
Jun 12 15:32:00 bigip1 notice mcpd[12345]: 01070638:5: AUDIT - user 'admin' -
object 0:0:50 - transaction status: Commit complete
```

FIG. 6

__Log type/Pattern__:

```
$1 $2 notice mcpd[$3]: 01070638:5: AUDIT - user '$4' - object $5 - transaction
status: $6
```

FIG. 7

Columns:

| $1 | $2 | $3 | $4 | $5 | $6 |
|---|---|---|---|---|---|
| Jun 12 15:20:00 | bigip1 | 12345 | admin | 0:0:10 | Commit complete |
| Jun 12 15:23:00 | bigip1 | 12345 | guest | 0:0:20 | Rollback complete |
| Jun 12 15:26:00 | bigip1 | 12345 | admin | 0:0:30 | Commit complete |
| Jun 12 15:29:00 | Bigip2 | 14545 | guest | 0:0:40 | Commit complete |
| Jun 12 15:32:00 | bigip1 | 12345 | admin | 0:0:50 | Commit complete |

FIG. 8

METHODS FOR ASSISTING OPTIMIZATION OF TARGET UNSTRUCTURED LOG DATA PROCESSING AND DEVICES THEREOF

FIELD

This disclosure relates to log data processing, in particular, to assisting optimization of target unstructured log data processing.

BACKGROUND

Log data provides an important source of data to learn about what events have occurred in a system, an application, or on a network device. Data catalog systems are used to maintain inventories of schemas and metadata for processing of the log data. Data catalog systems may process various logs and add descriptions (e.g., data type) to its maintained log entries. These log data processed by the data catalog systems can be stored in one or more databases providing structured and searchable repositories of data assets. Prior data catalog systems provided good performance when processing structured log data, however these systems have had limited capability to process unstructured log data.

This can be a substantial issue because there are often massive amounts of unstructured logs in legacy and new software. The varied formats and lack of predefined structure in this type of log data presents an integration challenge for data catalog systems. Although a family of printf-like functions can be utilized to format and write text to standard output for reporting logs and events, information in unstructured log data, this is not an effective or efficient manner for processing and managing this unstructured log data.

SUMMARY

This disclosure is directed to methods and apparatus related to assisting optimization of target unstructured log data processing. Relevant non-transitory computer readable medium and network traffic management systems are also disclosed.

According to an aspect of the disclosure, a method may be implemented by a network traffic management system, wherein the network traffic management system may comprise one or more network traffic management apparatuses, edge devices, client devices, or server devices. The method may comprise receiving a query from a log processing device configured to process target unstructured log data, the target unstructured log data comprising information describing events that have occurred in a network, a network application, or a network device, and retrieving, responsive to the received query, one or more entries stored in a log catalog storage. The one or more entries are resulted from actions including: extracting, from the training log data, one or more templates and corresponding parameters, prompting a natural language processing model with the one or more templates and parameters to generate a log type template structure descriptor and a log schema parameter specification, and storing the log type template structure descriptor and the log schema parameter specification as the one or more entries in the log catalog storage. The method transmitting the one or more retrieved entries to the log processing device.

According to another aspect of the disclosure, an apparatus may comprise memory comprising programmed instructions stored in the memory and one or more processors configured to be capable of executing the programmed instructions stored in the memory to: receive a query from a log processing device configured to process target unstructured log data, the target unstructured log data comprising information describing events that have occurred in a network, a network application, or a network device, and retrieve, responsive to the received query, one or more entries stored in a log catalog storage. The one or more entries are resulted from actions including: extracting, from training log data, one or more templates and corresponding parameters, prompting a natural language processing model with the one or more templates and parameters to generate a log type template structure descriptor and a log schema parameter specification, and storing the log type template structure descriptor and the log schema parameter specification as the one or more entries in the log catalog storage. Then the one or more processors may transmit the one or more retrieved entries to the log processing device.

According to another aspect of the disclosure, a non-transitory computer readable medium may have stored thereon instructions, comprising executable code which when executed by one or more processors, causes the one or more processors to receive a query from a log processing device configured to process target unstructured log data, the target unstructured log data comprising information describing events that have occurred in a network, a network application, or a network device, and retrieve, responsive to the received query, one or more entries stored in a log catalog storage. The one or more entries are resulted from actions including: extracting, from training log data, one or more templates and corresponding parameters, prompting a natural language processing model with the one or more templates and parameters to generate a log type template structure descriptor and a log schema parameter specification, and storing the log type template structure descriptor and the log schema parameter specification as the one or more entries in the log catalog storage. Then the executable code may further cause the one or more processors to transmit the one or more retrieved entries to the log processing device.

According to another aspect of the disclosure, a network traffic management system comprising one or more traffic management apparatuses, server devices, or client devices is disclosed. The network traffic management system may comprise memory comprising programmed instructions stored thereon and one or more processors configured to be capable of executing the stored programmed instructions to: receive a query from a log processing device configured to process target unstructured log data, the target unstructured log data comprising information describing events that have occurred in a network, a network application, or a network device, and retrieve, responsive to the received query, one or more entries stored in a log catalog storage. The one or more entries are resulted from actions including: extracting, from training log data, one or more templates and corresponding parameters, prompting a natural language processing model with the one or more templates and parameters to generate a log type template structure descriptor and a log schema parameter specification, and storing the log type template structure descriptor and the log schema parameter specification as the one or more entries in the log catalog storage. Then the one or more processors may transmit the one or more retrieved entries to the log processing device.

Examples of this technology provide a number of advantages including optimizing processing and management of target unstructured log data. An automatic log cataloging system may be deployed for providing various entries stored in the log catalog storage. With the generated log type template structure descriptors and log schema parameter specifications for a plurality of templates, data catalog systems may have more knowledge about the unstructured log data. With the log parser specification, data catalog systems may extract structure from unstructured log data. Moreover, with the statistical information provided herein, various customized optimizations of log data processing may be achieved. The process of generating the log type template structure descriptors and log schema parameter specifications can be seen as an automatic process to reverse the outputs of printf-like functions into a structured representation to infer metadata and schemas in log data. Therefore, target unstructured log data may be explored more effectively. Accordingly, systems for log parsing and analysis, log transport, log processing, and log storage may benefit from the operations discussed in this disclosure. In some examples, the automatic log cataloging system may be enriched and adjusted or accommodated with preferences of these systems (e.g., with a goal of optimizing target unstructured log transport, target unstructured log data storage, etc.). The above and other aspects and advantages and their implementations are described in greater detail in the drawings, the descriptions, and the claims below.

BRIEF DESCRIPTION OF THE DRAWINGS

The foregoing and other aspects of the present disclosure are best understood from the following detailed description when read in connection with the accompanying drawings. For the purpose of illustrating this technology, specific examples are shown in the drawings, it being understood, however, that the examples of this technology are not limited to the specific instrumentalities disclosed. Included in the drawings are the following Figures:

FIG. 5 illustrates an exemplary segment of log data;

FIG. 6 illustrates an exemplary collection of a same type of log entries;

FIG. 7 illustrates an exemplary template for the collection of log entries in FIG. 6;

FIG. 8 illustrates an exemplary extraction result of the collection of log entries in

FIG. 6;

DETAILED DESCRIPTION

Figure 1:
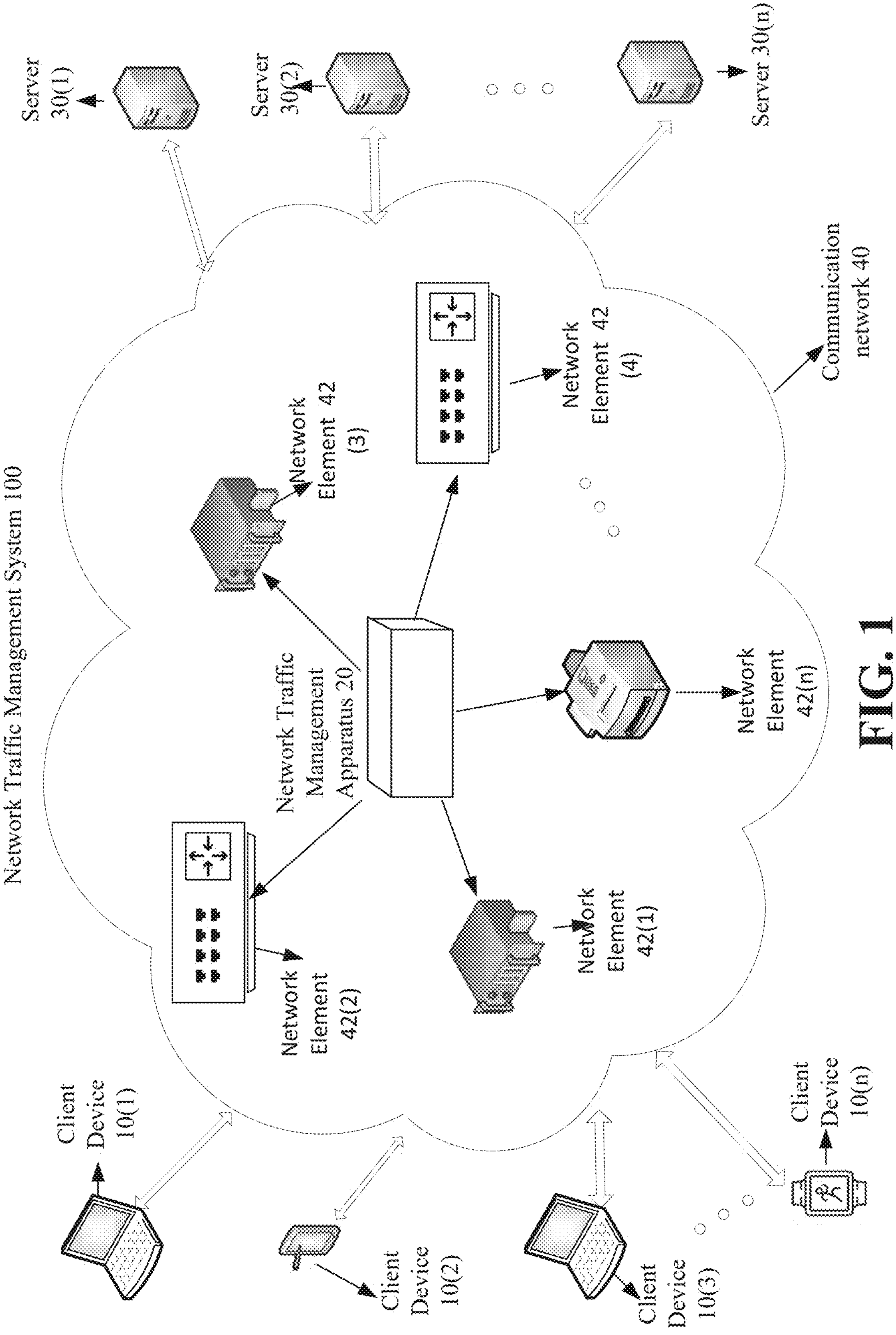
FIG. 1 illustrates an exemplary network traffic management system.

The present disclosure may be understood more readily by reference to the following detailed description of exemplary examples. Before the exemplary implementations and examples of the methods, devices, and systems according to the present disclosure are disclosed and described, it is to be understood that implementations are not limited to those described within this disclosure. Numerous modifications and variations therein will be apparent to those skilled in the art and remain within the scope of the disclosure. It is also to be understood that the terminology used herein is for describing specific implementations only and is not intended to be limiting. Some implementations of the disclosed technology will be described more fully hereinafter with reference to the accompanying drawings. This disclosed technology may, however, be embodied in many different forms and should not be construed as limited to the implementations set forth therein.

In the following description, numerous specific details are set forth. But it is to be understood that examples of the disclosed technology may be practiced without these specific details. In other instances, well-known components, structures, and techniques have not been shown in detail in order not to obscure an understanding of this description. References to "an implementation," "an example," "some examples," etc., indicate that the implementation(s) of the disclosed technology so described may include a particular feature, structure, or characteristic, but not every implementation necessarily includes the particular feature, structure, or characteristic. Further, repeated use of the phrase "in some examples" does not necessarily refer to the same implementation, although it may. Additionally, it is to be understood that particular features, structures, or characteristics that are described in different examples, implementations or the like, may be further combined in various ways and being implemented in one or more implementations.

A network traffic management system may relate to a set of tools, processes, devices, and relevant technologies to control and optimize data flow within a computer network. Such network traffic management system may monitor, analyze, control and balance network traffic to maintain the performance and reliability of a computer network. A network traffic management system may be implemented in various network topologies. Devices utilized and topologies designed in a network environment may depend on specific requirements and a scale of a network. Factors may include such as the size of the network, its geographic spread, the types of applications and services being offered, the organization's traffic management requirements, etc. For example, the network traffic management system may be implemented in a centralized, distributed, or cloud-based topology in various networks. The network traffic management system may be executed in various networks, include but not limited to, Local Area Networks (LAN), Wide Area Networks (WAN), Metropolitan Area Network (MAN), data center networks, cloud networks, hybrid networks, or any appropriate existing networks or the ones that may be developed in the future. Various devices may be involved in the network traffic management system, depending on the specific network and topology being used. For example, edge routers or switches, firewalls, proxies, load balancers, Content Delivery Network (CDN) servers, application servers, etc. may be included in a network traffic management system.

A network traffic management apparatus may refer to an apparatus executing one or more operations as will be described below to assist optimization of target unstructured log data processing. The target unstructured log data as mentioned in this disclosure refers to any unstructured log data that has not been processed yet and is desired or has a need to be processed in an optimized way. The processing of such target unstructured log data may be optimized by retrieving the log type template structure descriptor(s) and/ or log schema parameter specification(s) generated based on the operations described herein and further utilizing them during the processing. Herein, the log data is considered as a type of network traffic, which may be processed, stored, and further transported within a network traffic management system. The network traffic management apparatus may reside at any network devices (e.g., a router, a switch, a Smart Network Interface Card (Smart NIC), etc.) or components that is communicatively connected to any device, component or system being configured to process target unstructured log data.

A network service device may be any network device that provides a service to a user device. The network service device may be implemented in various ways, such as hardware, software, firmware, or any combination thereof. For example, the network service device may be a server of the network traffic management system (e.g., a web application server, such as one of the servers 30(1)-30(*n*) illustrated in FIG. 1 which will be described in the following), or a virtual machine, virtual server, container, engine, instance or the like that resides at a server or other network elements.

A user device may refer to any user device that may send or initiate a request to the network service device to establish or continue to a communicative connection with the network service device. Similar as the network service device, the user device may be implemented in various ways, including but not limited to, hardware, software, firmware, or any combination thereof.

FIG. 1 illustrates an exemplary simplified network traffic management system 100 according to an example of this disclosure. As illustrated in FIG. 1, the network traffic management system 100 may comprise a plurality of client devices 10(1)-10(*n*), a communication network 40, and a plurality of servers 30(1)-30(*n*) serving the client devices 10(1)-10(*n*). The client devices 10(1)-10(*n*) and servers 30(1)-30(*n*) may communicatively connect with each other via the communication network 40.

Referring to FIG. 1, as an exemplary implementation of the user device discussed above, one of the client devices 10(1)-10(*n*) may send a request to one of the servers 30(1)-30(*n*) for a service (e.g., via a web browser installed at one of the client devices 10(1)-10(*n*)). The client devices 10(1)-10(*n*) may also be referred to as a “client,” “user equipment,” or “user equipment device,” which may include but is not limited to a mobile phone, smartphone, tablet, laptop computer, a smart electronics, a wearable device, a video surveillance device, an industrial wireless sensors, or an appliance including an air conditioner, a television, a refrigerator, an oven and the like, or other devices that are capable of communicating wirelessly over a network. Moreover, one or more of the client devices 10(1)-10(*n*) may also be a proxy or a server or any network elements or devices, which may forward above discussed request and thereby initiate traffic flow towards one of the servers 30(1)-30(*n*) on behalf of its internal user equipment(s). For example, one or more of the client devices 10(1)-10(*n*) may be a proxy (e.g., a forward proxy) of a private network, which forwards a request message that it received from a client device isolated within the private network. In this way, the proxy sends a request message on behalf of the isolated device and allows it to be served by one of the servers 30(1)-30(*n*). In this scenario, the proxy plays the role of one of the client devices 10(1)-10(*n*) in the network traffic management system 100 as illustrated in FIG. 1.

Continuing to refer to FIG. 1, as an exemplary implementation of the network service device discussed above, the one of the servers 30(1)-30(*n*) may respond to one of the client devices 10(1)-10(*n*) and have one or more interactions with one of the client devices 10(1)-10(*n*) to provide the requested service or data, in response to receiving the request from one of the client devices 10(1)-10(*n*) via the communication network 40. The servers 30(1)-(*n*) may be any types of servers to serve a client device. For example, the servers 30(1)-(*n*) may be application servers that run applications, manage, and execute various tasks related to the processing of user device’s requests within the network environment. Various services may be provided by the servers 30(1)-(*n*).

As illustrated in FIG. 1, the communication network 40 may comprise a plurality of network elements 42(1)-42(*n*) to provide connectivity and data processing and transmission. Depending on the topology and features of the communication network 40, there may be various types of network elements 42(1)-42(*n*) (e.g., a router, a proxy, a load balancer, a firewall, etc.) to perform designated functionalities. As illustrated in FIG. 1, one of the client devices 10(1)-10(*n*) may communicatively connected to the communication network 40. When one of the client devices 10(1)-10(*n*) sends a message to request a service provided by one of the servers 30(1)-30(*n*), the message may go through some of the network elements 42(1)-42(*n*) before reaching its destination. It is to be understood that different network technologies may be applied by the communication network 40. For example, communication network 40 may be one or more wired or wireless public or private networks, based on any industry-standard protocols, such as Ethernet, Wi-Fi, Satellite Networks, 4G/LTE (Long-Term Evolution), 5G, and various internet protocols like TCP/IP. The communication network 40 may also be formed by connecting appropriate number of networks together as needed.

In the network environment illustrated in FIG. 1, to consume various services provided on the communication network 40 or conduct data transmission via the communication network 40, a large amount of log data may be generated at any of relevant devices (e.g., the client device 10(1)-10(*n*), the network element 42(1)-42(*n*), server 30(1)-30(*n*)). Therefore, any of such devices may have a need to process the target unstructured log data. Then the network traffic management apparatus 20 may reside on such device or communicatively connect with such device, to implement the operations described in this disclosure to assist and optimize the processing. It is to be understood that although being illustrated as within the communication network 40, the network traffic management apparatus 20 may be located at any appropriate location as needed to manage and process the log data as described herein. As discussed above, without knowing an original source code for generating the log data, it could be hard for the device (e.g., the network traffic management apparatus 20) to infer the structure of certain log data. The log data may comprise one or more types of structure(s), and it could be hard to infer the structure and parameters or variables included in the data for each type of log data.

It is to be understood that FIG. 1 illustrates an exemplary simplified network traffic management system 100 to which many variations may be made. For example, other types and numbers of systems, devices, components, and elements in other topologies may be used to add into the illustrated system or replace any part of the illustrated system. Furthermore, one or more of the components depicted in the network traffic management system 100, such as the network traffic management apparatus 20, may be configured to operate as virtual instances on the same or different physical machine(s). In some scenarios, the network traffic management apparatus 20 may operate as more than one separate devices at different physical devices, and communicatively connected with each other through communication network 40 or other relevant network(s) as needed, rather than operate on the same physical device as illustrated in FIG. 1.

Figure 2:
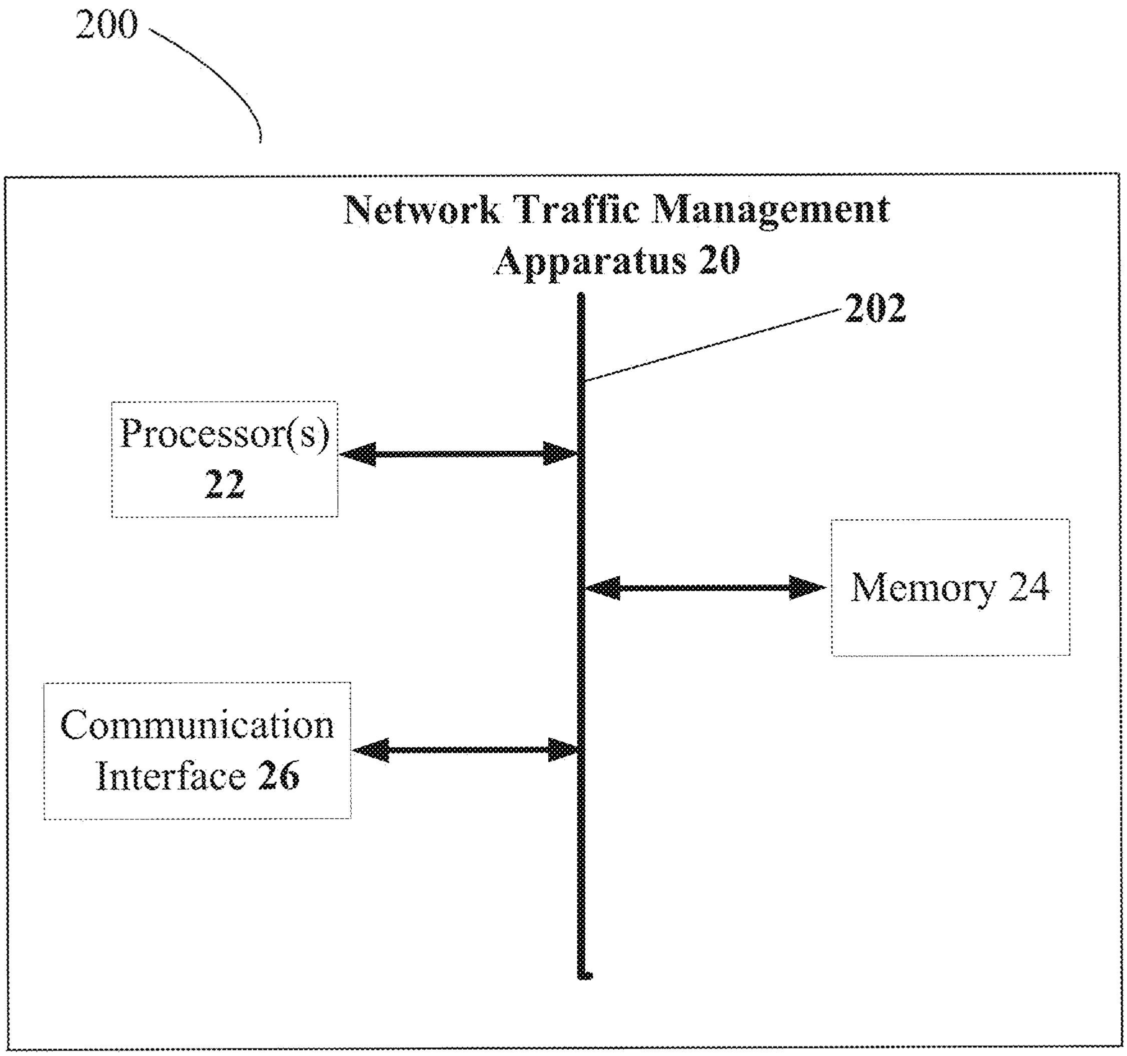
FIG. 2 illustrates an exemplary execution environment of a network traffic management apparatus.

FIG. 2 shows an exemplary execution environment 200 of the network traffic management apparatus 20. In the execution environment 200, the network traffic management apparatus 20 may include processor(s) 22, a memory 24, a communication interface 26 and/or other circuitries, which are coupled together by a bus 202 or other communication link. It is to be understood that the network traffic management apparatus 20 may include other types and/or numbers of elements in other configurations. The processor(s) 22 of the network traffic management apparatus 20 may execute programmed instructions stored in the memory 24 of the network traffic management apparatus 20 for any number of the operations or tasks identified in this disclosure. The processor(s) 22 of the network traffic management apparatus 20 may include one or more central processing units (CPU) or general-purpose processors with one or more processing cores, for example, although other types of processor(s) can also be used. The communication interfaces 26, which may support wireless, e.g., Bluetooth, Wi-Fi, WLAN, cellular (4G, LTE/A, 5G), and/or wired, Ethernet, Gigabit Ethernet, optical networking protocols. The communication interfaces 26 may also include serial interfaces, such as universal serial bus (USB), serial ATA, IEEE 1394, lighting port, I2C, slimBus, or other serial interfaces. In some examples, the execution environment 200 may further include power functions and various input interfaces (not shown in FIG. 2). In some examples, the execution environment 200 may further include a user interface that may include human-to-machine interface devices and/or graphical user interfaces (GUI).

The memory 24 of the network traffic management apparatus 20 may store these programmed non-transitory computer-readable instructions for one or more aspects of the technology as described and illustrated herein, although some or all of the programmed instructions could be stored elsewhere. A variety of different types of memory storage devices, such as random access memory (RAM), read only memory (ROM), Hard Disk Drive (HDD), solid state drives, flash memory, Erasable Programmable Read Only Memory (EPROM), or other computer readable medium such as magnetic or optical disc (e.g., Compact Disc Read Only Memory (CD-ROM)) which is read from and written to by a magnetic, optical, or other machine-readable medium that is coupled to the processor(s) 22, may be used as the memory 24. Accordingly, the memory 24 of the network traffic management apparatus 20 may store application(s) that can include computer executable instructions that, when executed by the network traffic management apparatus 20, cause the network traffic management apparatus 20 to perform actions or operations, such as to transmit, receive, or otherwise process messages, for example, and to perform other actions or operations described and illustrated below with reference to the drawings. An application may be implemented as a unit, module, component, instance, or engine of other applications and/or operating system extensions, plugins, or the like. The application(s) can be executed within or as virtual machine(s) or virtual server(s) that may be managed in a cloud-based computing environment, without being tied to one or more specific physical network devices.

The methods, devices, processing, circuitry, and logic described below may be implemented in many different ways and in many different combinations of hardware, software, firmware, or combination thereof. For example, all or parts of the implementations may be circuitry that includes an instruction processor, such as a Central Processing Unit (CPU), microcontroller, or a microprocessor; or as an Application Specific Integrated Circuit (ASIC), Programmable Logic Device (PLD), or Field Programmable Gate Array (FPGA); or as circuitry that includes discrete logic or other circuit components, including analog circuit components, digital circuit components or both; or any combination thereof. The circuitry may include discrete interconnected hardware components or may be combined on a single integrated circuit die, distributed among multiple integrated circuit dies, or implemented in a Multiple Chip Module (MCM) of multiple integrated circuit dies in a common package, as examples.

Accordingly, the circuitry may store or access instructions for execution, or may implement its functionality in hardware alone. The instructions may be stored in a tangible storage medium (e.g., memory 24) that is other than a transitory signal. A product, such as a computer program product, may include a storage medium and instructions stored in or on the medium, and the instructions when executed by the circuitry in a device may cause the device to implement any of the processing described above or illustrated in the drawings.

The implementations discussed herein may be distributed. For instance, the circuitry may include multiple distinct system components, such as multiple processors and memories, and may span multiple distributed processing systems. Parameters, databases, and other data structures may be separately stored and managed, may be incorporated into a single memory or database, may be logically and physically organized in many different ways, and may be implemented in many different ways. Example implementations include linked lists, program variables, hash tables, arrays, records (e.g., database records), objects, and implicit storage mechanisms. Instructions may form parts (e.g., subroutines or other code sections) of a single program, may form multiple separate programs, may be distributed across multiple memories and processors, and may be implemented in many different ways. Example implementations include stand-alone programs, and as part of a library, such as a shared library like a Dynamic Link Library (DLL). The library, for example, may contain shared data and one or more shared programs that include instructions that perform any of the processing described above or illustrated in the drawings, when executed by the circuitry.

Figure 3:
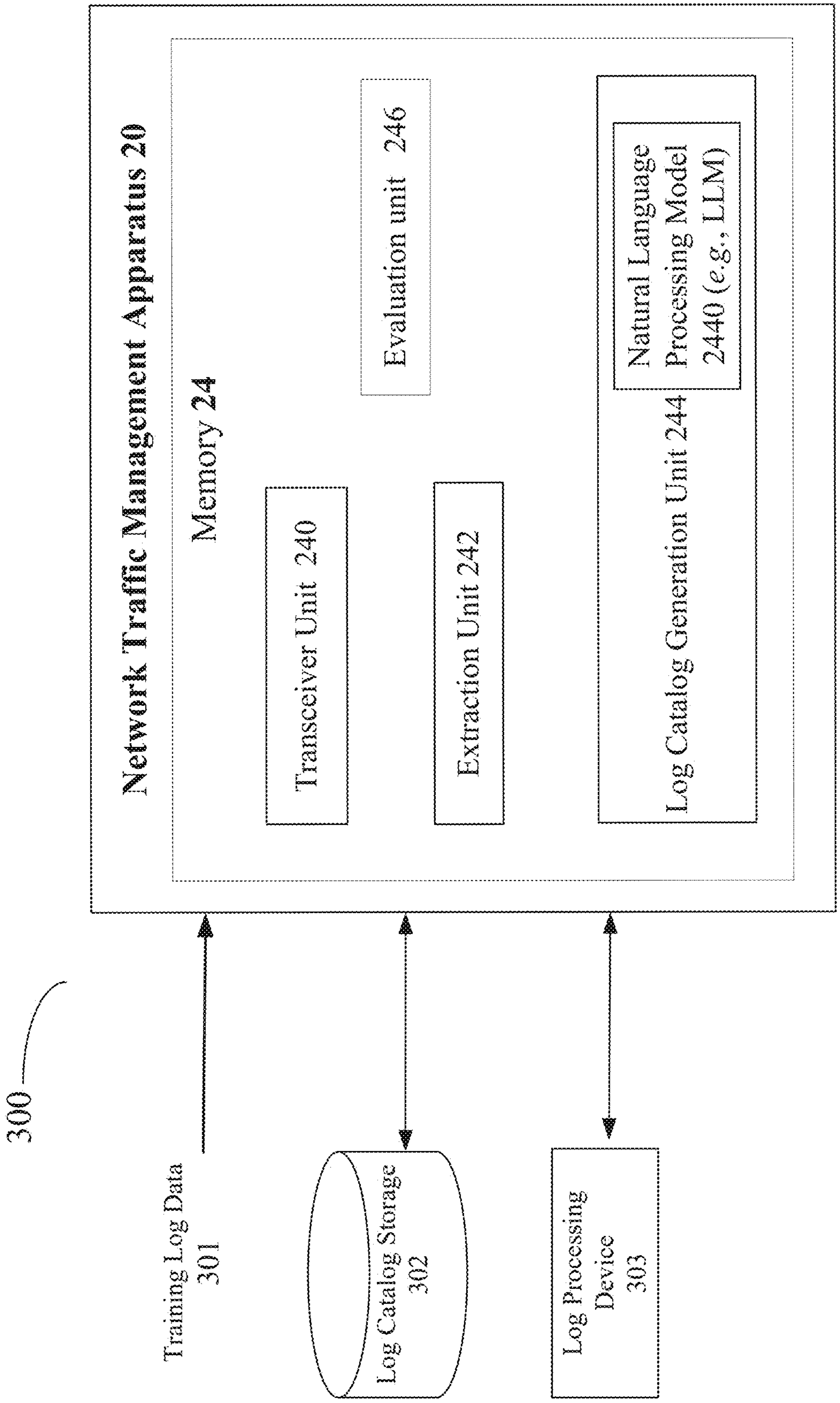
FIG. 3 illustrates an exemplary block diagram of a network traffic management apparatus.

Referring to FIG. 3, an exemplary block diagram of the network traffic management apparatus 20 to assist optimization of target unstructured log data processing is illustrated. In FIG. 3, the network traffic management apparatus 20 may comprise transceiver unit 240, extraction unit 242, log catalog generation unit 244, and evaluation unit 246. Operations performed by those units will be described in conjunction with the flow diagram illustrated in FIG. 4. Those units described herein may be implemented with various available or appropriate programing APIs, such as JavaScript, Python, etc.

The term "unit" (and other similar terms such as module, submodule, etc.) may refer to computing software, firmware, hardware, and/or various combinations thereof. At a minimum, however, units are not to be interpreted as software that is not implemented on hardware, firmware, or recorded on a non-transitory processor readable recordable storage medium. Indeed, "unit" is to be interpreted to include at least some physical, non-transitory hardware such as a part of a processor, circuitry, or computer. Two different units may share the same physical hardware (e.g., two different units can use the same processor and network interface). The units described herein can be combined, integrated, separated, and/or duplicated to support various applications. Also, a function described herein as being performed at a particular unit can be performed at one or more other units and/or by one or more other devices instead of or in addition to the function performed at the particular unit. Further, the units can be implemented across multiple devices and/or other components local or remote to one another. Additionally, the units can be moved from one device and added to another device, and/or can be included in both devices. The units can be implemented in software stored in memory or non-transitory computer-readable medium. The software stored in the memory or medium can run on a processor or circuitry (e.g., ASIC, PLA, DSP, FPGA, or any other integrated circuit) capable of executing computer instructions or computer code. The units can also be implemented in hardware using processors or circuitry on the same or different integrated circuit.

Figure 4:
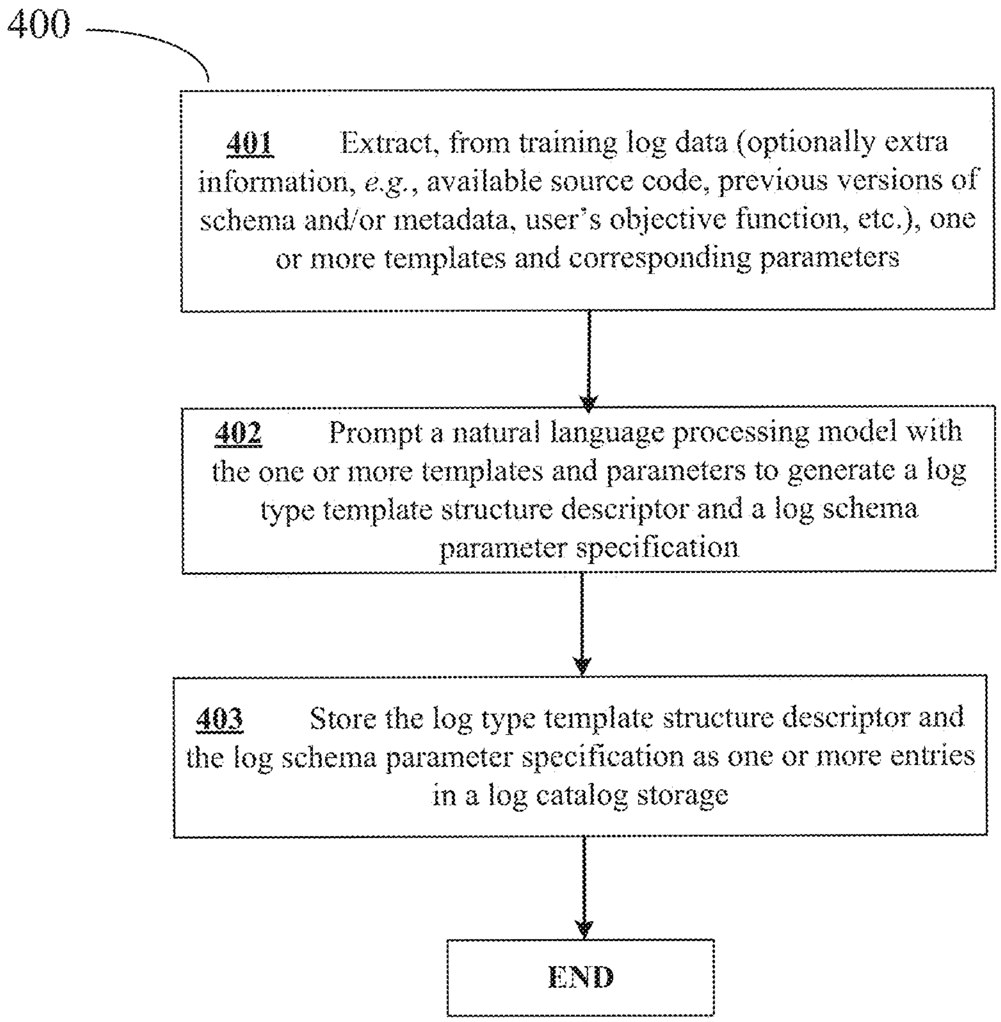
FIG. 4 illustrates a flow diagram of an exemplary method for generating entries for a log catalog system from training log data.

FIG. 4 illustrates a flow diagram of an exemplary process 400 for optimizing processing of target unstructured log data implemented or executed by the network traffic management apparatus 20. In the following example, steps illustrated in FIG. 4 will be described in conjunction with the logic of the network traffic management apparatus 20 shown in FIG. 3. As illustrated in FIG. 3, the transceiver unit 240 of the network traffic management apparatus 20 may be communicatively connected to a source (e.g., training log data 301) to provide historical unstructured log data as training log data, a log catalog storage 302, and a log processing device 303.

At step 401, the extraction unit 242 of the network traffic management apparatus 20 may extract one or more templates from training log data. The unstructured log data as mentioned in this disclosure may comprise information describing events that have occurred in a network, a network application, or a network device. The training log data from which the templates are extracted at step 401 is unstructured log data that collected from any appropriate data source. Such unstructured log data may be collected from time to time, or periodically, or in any other appropriate manner and is utilized herein as training data for generating log type template structure descriptors and log schema parameter specifications at step 402, which will be described in detail in the following. Therefore, the collected unstructured log data may also be considered as historical unstructured log data based on which various metadata (e.g., log type template structure descriptors and/or log schema parameter specifications) can be generated. As a comparison and as discussed above, the target unstructured log data refers to unstructured log data whose processing may be optimized by using the generated metadata. For each type of the historical unstructured log data, the extraction unit 242 may extract one or more templates, which may be input into the log catalog generation unit 244 to generate a log type template structure descriptor and a log schema parameter specification for that type of unstructured log data subsequently. For each template, the extraction unit 242 also extracts a set of parameters. In this regard, any appropriate method may be used to conduct the extraction. By way of example, clustering-based log parsing, frequent pattern mining, heuristic approaches, sequence alignment algorithms, parsing trees, and ML-based approaches may be used.

By way of example, an unstructured log data that comprises a set of log entries is illustrated in FIG. 5. In FIG. 5, for illustration purposes, each log entry is marked in one color, wherein log entries of the same type are marked with the same color. FIG. 6 illustrates an example of the set of log entries which are all in green in FIG. 5.

As shown in FIG. 5, a log data may have a plurality of log entries comprising multiple different types, although in other examples there could be just one type. As illustrated in the examples in FIGS. 5-6, the information recorded in the log entries is not straightforward. For example, as illustrated in FIG. 6, for the same type of log entries, they have some common fields which are static and do not change among those log entries and there are other fields in the log entries that may vary and therefore constitute a difference between different log entries. The common fields which are static may form a portion of a template for this type of log entries, while the other fields which are different may each be designated with a variable parameter.

FIG. 7 illustrates an exemplary template for the log entries in FIG. 6. In this example, a template may represent or indicate a log description pattern, which is common among a set of log entries in the same type. A parameter in the template, i.e., the green portions in FIG. 7, may represent or indicate a variable in the log description pattern. By way of example, the extracted set of parameters may be the variable parts in the printf-like statements, such as placeholders in a format string. Herein, printf is a C standard library formatting function that formats text and writes the text to a standard output. A set of similar functions form a family and can be called printf-like functions. The printf-like functions can accept a format string parameter, which comprises verbatim text and a plurality of format specifiers each specify how to serialize a value (e.g., the placeholders). The printf-like functions can also accept a variable number of value parameters. The printf-like functions can serialize those value parameters based on the format string and write the serialized parameters to an output statement stream. Therefore, the variable parts in the printf-like statements can be used to compose the set of parameters at step 401. As shown in FIG. 7, the template is very generic and abstract and therefore in this example provides limited assistance from a data management perspective.

FIG. 8 further illustrates an exemplary extraction result of the collection of log entries in FIG. 6. Due to the limited information in the template in FIG. 7, the extraction result is very abstract as well. As set forth below, the following exemplary operations will make this exemplary template and its set of parameters extracted at step 401 more descriptive and useful.

Referring back to FIG. 4, in some examples, optionally, additional or extra information can also be utilized at step 401 to facilitate the extraction. By way of example, some additional relevant source code(s) if available, previous generated schema and/or metadata (e.g., based on previously generated log type template structure descriptor and a log schema parameter specification), any objective functions input or specified by a user, or any combination thereof. The utilization of such extra information will be described in detail in the following.

At step 402, the log catalog generation unit 244 of the network traffic management apparatus 20 may prompt, for the extracted one or more templates, a natural language processing model 2440 (e.g., large language model) with the template(s) and parameters, to generate a log type template structure descriptor and a log schema parameter specification. In some examples, the prompting is performed for each template. At this step, correction(s) and/or further descriptions may be made to the template extracted at step 401. The log type template structure descriptor may describe (e.g., in a structured manner) the structure of the template. To generate the log type template structure descriptor, a prompt may include the extracted template. The related training data may include log examples that match the extracted template. Additionally, and optionally, some related entries (e.g., closely related ones) stored in the log catalog storage may also be included in the training data. At step 402, various contextual information may be aggregated and provided as a basis to generate the log type template structure descriptor and a log schema parameter specification. As a non-exhaustive and non-limiting example, the contextual information may comprise identified log patterns (e.g., identified by template extractor 902, existing schemas and template structures stored in catalog storage 302 that matches the patterns, results of the stats evaluator 9044, optional external sources 908 (e.g., source code), the user-defined objective function 906, a question formulated to generate a new or updated schema or log type template structure within orchestrator 904, or any combination thereof, which will be described in details in the following. Such contextual information may be incorporated into a prompt, or training data of the natural language processing model 2440. The training data may be input into the natural language processing model 2440 in advance during a training or for example any of that related data may be included in the prompt.

Figure 9:
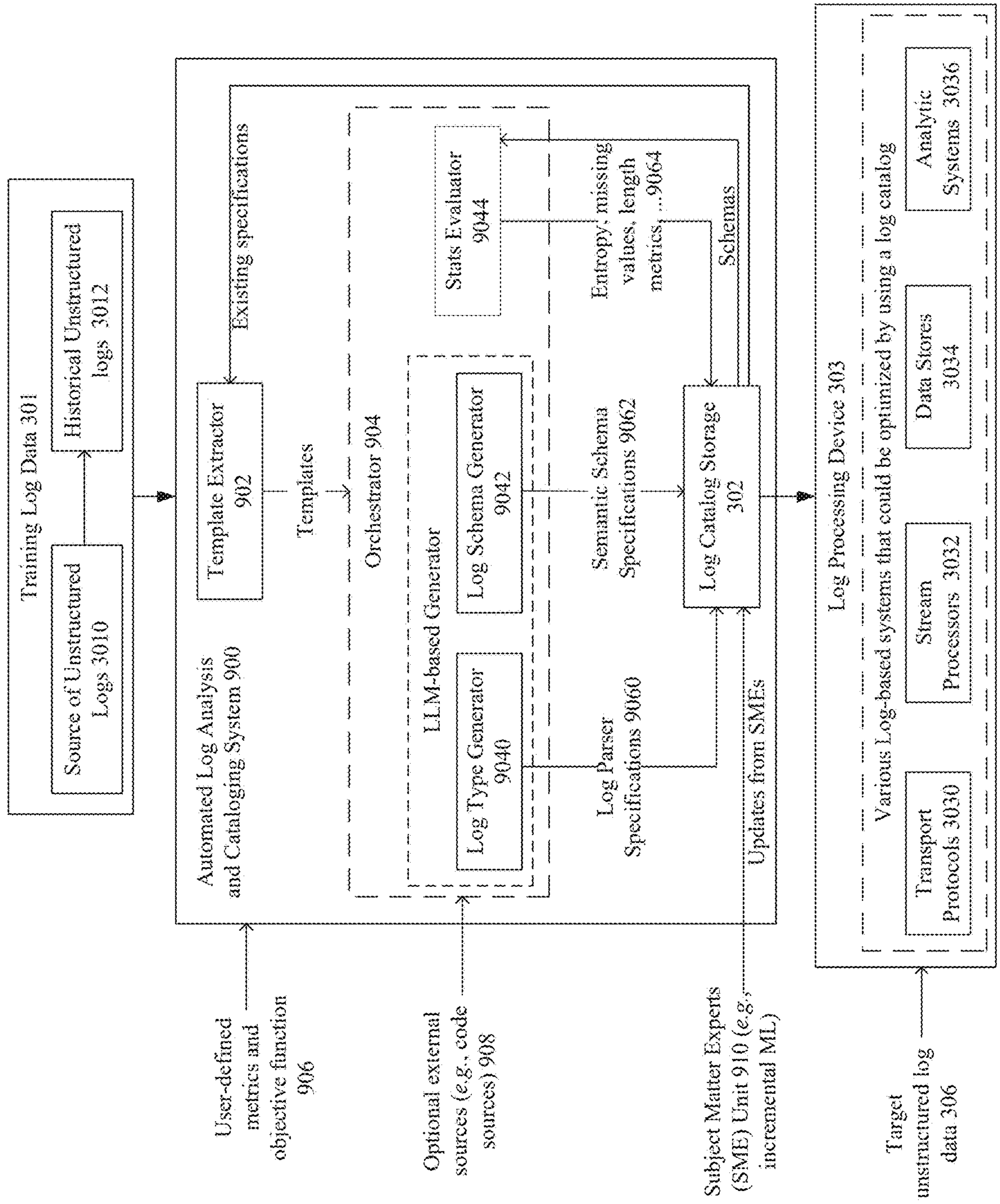
FIG. 9 illustrates another exemplary diagram for generating entries in a log catalog system from training log data to optimize various processing of target unstructured log data.

FIG. 9 illustrates an exemplary diagram for generating entries in a log catalog system from training log data to optimize various processing of target unstructured log data. In FIG. 9, an automated log analysis and cataloging system 900 communicatively connects with training log data 301 and log processing device 303. Training log data 301 represents a source of training data from which template(s) can be extracted at step 401, which can be any appropriate storing components (e.g., storage(s), database(s)). The log processing device 303 may be any log processing systems that are configured to process the target unstructured log data. As a non-limiting example merely for illustrative purpose, the log processing device 303 in FIG. 9 may be transport protocols 3030, stream processors 3032, data stores 3034, analytic systems 3036, or any combination thereof. The automated log analysis and cataloging system 900 generates a series of entries by implementing the steps in FIG. 4. Herein, the automated log analysis and cataloging system 900 has a similar structure for performing the same functionalities to the network traffic management apparatus 20 in FIG. 3. The extraction unit 242 in FIG. 3 is implemented as template extractor 902, the log catalog generation unit 244 is implemented as a log type generator 9040 and log schema generator 9042, and the evaluation unit 246 is implemented as statistic evaluator 9044. In FIG. 9, the automated log analysis and cataloging system 900 additionally comprise an orchestrator 904, which may coordinate the log type generator 9040, log schema generator 9042, and statistic evaluator 9044, which will be described in the following. It is to be understood that FIG. 9 is a non-limiting exemplary implementation for illustrative purpose, and in practical scenarios any appropriate changes could be made to fulfill the operations described herein. Therefore, in case a cataloging system implementing the operations in this disclosure does not have the orchestrator 904 as a separate component, the log catalog generation unit 244 or any other appropriate component may play the role of the omitted orchestrator 904 and coordinate with the evaluation unit 246.

In some examples, if source code that generated the historical unstructured log data are available, related snippets of the source code may also be provided to the natural language processing model 2440 to improve the accuracy of the generated log parser specifications 9060 and the semantic schema specifications 9062 (e.g., the definition or description in those specifications). By way of example, if the related source code is available from which names of variables used to feed the parameters or context of a log data can be obtained, the quality of a schema can be improved by inputting the relevant source code into the natural language processing model 2440. Herein, the extracted template may be used to retrieve the code snippets (e.g., via regular expressions or sentence embedding). As illustrated in FIG. 9, which is denoted as optional external sources 908. Such sources (e.g., code repositories) may provide additional information to the log entries being analyzed herein.

In some examples, the generated log type template structure descriptor includes contextual information. The contextual information provides a context of how the log type template structure descriptor is determined. In some examples, the log type template structure descriptor is a log parser specification 9060 as illustrated in FIG. 9. Such a log parser specification 9060 may be programmed as executable instructions (e.g., regular expression with the group definition in programing languages such as C, C++, etc.) which can be executed by a log processing device to extract structure from an unstructured log entry.

The log schema parameter specification comprises a schema for each parameter. In other words, the log schema parameter specification comprises a plurality of schemas (e.g., in a structured manner such as a table). Accordingly, the log schema parameter specification may be considered as a declaration of a structure of a template, from the perspective of the parameters included in the template. As a comparison, the parameters that are extracted at step 401 may be abstract or anonymous. While the log schema generated at step 402 may describe the parameter (e.g., in a structured manner) from a plurality of aspects. By way of example, the schema may include a name of the parameter, and a descriptor for the parameter indicating such as the data type of the parameter (i.e., type annotations), a description for the parameter (e.g., the user or functionality of the parameter), data distribution, and a few examples of the variables of this parameter, etc. To generate the log schema, a prompt may include the extracted template. The related training data may include a set of values for the analyzed parameter. Additionally, and optionally, some related entries (e.g., closely related ones) stored in the log catalog storage may also be included in the training data. Similarly to the log type template structure descriptor, the training data may be input into the natural language processing model 2440 in advance during a training or any of that related data may be included in the prompt. Similarly, in some examples, if source code that generates the historical unstructured log data is available, related snippets of the source code may also be provided to the natural language processing model. Herein, the extracted template may be used to retrieve the code snippets (e.g., via regular expressions or sentence embedding). In some examples, the generated log schema or the log schema parameter specification includes contextual information. The contextual information provides a context of how the log schema is determined.

It is to be understood that, for the sake of clarity, prompting the natural language processing model 2440 to generate the log type template structure descriptor and the log schema parameter specification are described separately. As shown in FIG. 9, the log type template structure descriptor (illustrated as log parser specifications 9060) and the log schema parameter specification (illustrated as semantic schema specifications 9062) can be generated separately, by the log type generator 9040 and log schema generator 9042 respectively. However, as illustrated in FIG. 4, they can be generated together in the same step or operation.

At step 403, the network traffic management apparatus 20 may store all the generated log type template structure descriptors and the log schema parameter specifications for the one or more templates as one or more entries in log catalog storage 302. Herein, as discussed above, all the information or the related portion that is stored in the log catalog storage 302 may be provided back to the natural language processing model 2440 as needed. Such information can be a portion of training data for generations of the log type template structure descriptors and the log schema parameter specifications in the future (e.g., by providing the stored schemas to orchestrator 904, the log type generator 9040, or the log schema generator 9042 in FIG. 9). Similarly, as illustrated in FIG. 9, such information may also be provided to the template extractor 902. In other words, such information may be provided back to the template extractor 902 in FIG. 9 or extraction unit 242 in FIG. 3 to assist in the optimization of the extraction operation (e.g., a more precise or more efficient extraction). In addition, as illustrated in FIG. 9, such information may also be provided to the statistic evaluator 9044, which will be described later in the following.

Continuing to refer to FIG. 9, the log catalog storage 302 may also receive input from Subject Matter Experts (SME) unit 910. With an appropriate interface (e.g., a graphical user interface), a searching query from the SME unit 910 may be received by the automated log analysis and cataloging system 900 (e.g., via a unit similar to the transceiver unit 240 in FIG. 3). In response to such searching query, any related information (e.g., the log type template structure descriptors, log schema parameter specifications 9062, a particular log schema or a subset of log schemas) generated by the automated log analysis and cataloging system 900 and stored in the catalog storage 302 may be transmitted to the SME unit 910 and displayed thereof. Also, by reviewing information transmitted from the automated log analysis and cataloging system 900, the SME unit 910 may make changes (e.g., make it more complete, annotate or correct the information, combining entries generated for two similar templates) to any of the information stored in the log catalog storage 302 based on extra knowledge (e.g., characteristic of the training log data, information from other type of log data that closely related to a specific type of template), preference (s). In a scenario that an update or refine is made to the entries stored in the log catalog storage 302 via SME unit 910, the log type template structure descriptor or the log schema parameter specification initially inferred by the log type generator 9040 or the log schema generator 9042 is changed. In some examples, when a subsequent learning cycle starts (e.g., triggered by sufficient new training log data become available, resulting in step 401 is performed again), the update or refinement made via SME unit 910 may be input or incorporated into the LLM context (e.g., a prompt) to facilitate the generation of additional log type template structure descriptors or the log schema parameter specifications at step 402. Because incorporating such an input via the SME unit 910 into subsequent operations may help improve subsequent inference(s) made by the log type generator 9040 and log schema generator 9042, the SME unit 910 is labeled as contributing to incremental machine learning. Similarly, as reflected in FIG. 10, the log catalog storage may also respond to a query from a log processing device 303.

As illustrated in FIG. 9, the automated log analysis and cataloging system 900 may comprise a statistic evaluator 9044 (which is similar to the evaluation unit 246 in FIG. 3). The statistic evaluator 9044 may evaluate, for each template, the template and each of its parameters to generate statistic information for one or more metrics. Herein, the statistic evaluator 9044 can be a natural language model-based model, with a learning ability from its previous calculation and evaluations. Alternatively, the statistics evaluator could also a non-natural language model-based model. Then the generated statistic information may be stored as one or more entries in the log catalog storage 302. Herein, the statistic evaluator 9044 may calculate a set of statistics for various metrics 9064. By way of example, the metrics include range, mode, standard deviation, quantiles of the template, wherein descriptive statistics can be generated in this regard. Also, the metrics may include distribution metrics (e.g., entropy, skewness), missing value metrics, frequency metrics, length metrics, and correlation metrics. Taking the length metric as an example, the statistical information may indicate how long a specific parameter is on average, its maximum and minimum length respectively. As another example, the missing value may indicate quality of a parameter, such as the reliability of a parameter whose value is missing in half of the examined log entries. The calculation can be made based on some exemplary log entries that match with this template (e.g., historical unstructured log entries), and the generated log type template structure descriptors and the log schema parameter specifications.

For example, for a given parameter, the schema indicates the data type is a string. But after checking all the exemplary log entries, the statistic evaluator 9044 calculates that in 70% of the exemplary log entries it is an integer. The statistic evaluator 9044 may generate descriptive statistic information for this result. In some examples, this statistic information may assist with improving the generation of the log type template structure descriptors and the log schema parameter specifications. For example, the statistic information may trigger a refinement of log type template structure descriptors and/or the log schema parameter specifications previously generated (e.g., when finding a more precise data type to define for a parameter), to generate new log type template structure descriptors and/or the log schema parameter specifications. For example, a new schema for a specific parameter may indicate a different data type than the previous schema. In this way, the log cataloging information stored in the log catalog storage 302 may be more precise or accurate progressively with continued refinements, based on a better understanding on the historical unstructured data (e.g., the data types of the parameters or the template). With the automated log analysis and cataloging system 900 in FIG. 9 to implement the operations in this disclosure, orchestrator 904 can determine whether to operate the log type generator 9040 and/or the log schema generator 9042 to refine the generated log type template structure descriptors and/or the log schema parameter specifications. With the network traffic management apparatus 20 in FIG. 3 to implement the operations in this disclosure, the log catalog generation unit 244 may decide or determine whether to perform a refinement. As another example, the statistic information may not only trigger a refinement, but also facilitate generation(s) of the log type template structure descriptors and/or the log schema parameter specifications that it describes during a refinement (e.g., help in generating the data type more precisely by such as being included in a context). As a further example, the statistic information may facilitate the natural language model (e.g., natural language processing model 2440 in FIG. 3, the log type generator 9040 and the log schema generator 9042 in FIG. 9) to optimize its output by being a portion of the training data. Herein, the orchestrator 904 or the log catalog generation unit 244 may coordinate or decide how to utilize the generated information which is stored in the log catalog storage 302 for subsequent operations described herein (e.g., whether and when to conduct the refinement, what data is going to be used as a portion of training data, etc.).

In some further examples, another evaluator similar to the evaluation unit 246 or the statistic evaluator 9044 may be used to evaluate the extracted template 9020 and the parameters that output from the template extractor 902 or the extraction unit 242. After the evaluation, templates and the parameters that have been evaluated as appropriate may be input into the orchestrator 904 or the log catalog generation unit 244. Herein, templates and the parameters that have been evaluated as inappropriate may be discarded. In this scenario, the evaluator may decide whether to operate the template extractor 902 to perform additional extractions if the quality of the generated templates and parameters are low. In this regard, the generated statistic information may be utilized by such additionally deployed evaluator. Alternatively, if there is no such additionally deployed evaluator in the network traffic management apparatus 20 or the automated log analysis and cataloging system 900, the statistic information may also be input into the natural language model directly (e.g., during the prompting operation at step 402).

Additionally, the generated statistic information may also facilitate a log processing device 303. For example, the statistic information may be used by such device when optimizing the ordering of log entries inside a batch to enhance the compression ratio. As another example, the statistic information of each parameter for the entropy metric may be used to determine the level of randomness or unpredictability that present in log entries. It is to be understood that parameters with lower entropy are more compressible. Accordingly, the log processing device 303 may find an optimized way to transport or store a batch of these log entries (e.g., with an "order by" statement). The log processing device 303 may be one device, or a system comprising one or more devices as illustrated in FIG. 9. The log processing device 303 itself may comprise the SME unit 910, or be one of the optional external sources 908, or provide user-defined metrics and objective function 906 which will be described in the following. Therefore, the log processing device 303 may also utilize the statistic information while operating the SME unit 910 to provide any input for making any change to the entries stored in the log catalog storage 302.

Referring to FIG. 9, optionally, user-defined metrics and objective function 906 may be provided via an interface deployed for this purpose. In this way, a user (e.g., an administrator who operates the network traffic management apparatus 20, or a user operating the log processing device 303) may input (e.g., via a graphical user interface) one or more preferred metric values. By way of example, a user may specify how precise and/or stable the schema should be, or the minimum compression rate, etc. Such input values may impact all the operations by the automated log analysis and cataloging system 900 in FIG. 9.

For example, the user's input from one of the client devices 10(1)-10(*n*) or a log processing device 303 may impact which entries in the log catalog storage need to be discarded (e.g., due to failing to satisfy the preferred value (s)), and/or refined by repeating the prompting and/or extracting operations. In a scenario where the user that operates the log processing device 303, the input preferred value(s) may assist the log processing device 303 in defining its own customized metrics and therefore obtain customized log catalog data. For example, in a scenario wherein a schema indicates a parameter being a string but statistical information indicates this parameter being an integer in most observed exemplary log entries, a user or system prefers to stability of the generated log cataloging information may not trigger a refinement to change the data type of this parameter. However, a user or system having a higher priority of accuracy (e.g., pursuing an optimized compression rate) for the generated log cataloging information may trigger a refinement to change the data type of this parameter to integer. Accordingly, this feature is advantageous because different log processing devices 303 may have different priorities for those metrics. Optionally, the user at one of the client devices 10(1)-10(*n*) or a log processing device 303 may also define or specify new metric(s). In this way, the log processing device 303 is allowed to optimize or even maximize its objectives by utilizing the log type template structure descriptors and the log schema parameter specifications which are generated based on its customized preferred value(s). Accordingly, the log processing on the log process device 303 is also optimized. By way of example, a log transport system may optimize the compression rate of the log entries but may not prioritize the stability of the templates over time. To the contrary, a storage system may prefer to optimize schema stability to make the data easier to process. In some examples, if the user specified more than one preferred value, those values may be composed as an objective function.

In some examples, the prompting step may be repeated to refine the log type template structure descriptor and the log schema parameter specification generated previously. For example, the repeat can be made based on the generated statistic information (e.g., which aspect(s) should be improved in the generated log type template structure descriptor and/or the log schema parameter specification). Next, the refined log type template structure descriptor and log schema parameter specification may be stored as one or more entries in the log catalog storage 302 (e.g., replace the previous one, or stored as additional entries wherein the previous one may be used as training data of the natural language processing model).

Figure 10:
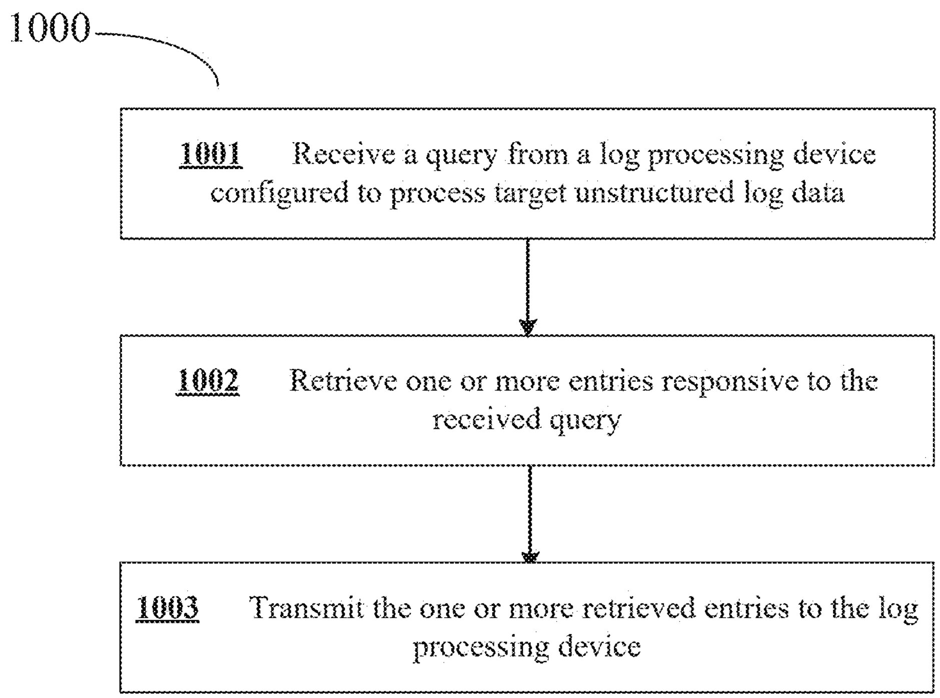
FIG. 10 illustrates a flow diagram of an exemplary method for optimizing the processing of target unstructured log data.

FIG. 10 illustrates a flow diagram of an exemplary method 1000 for optimizing a processing of target unstructured log data. At step 1001, the transceiver unit 240 may receive a query from a log processing device 303 which is configured to process target unstructured log data. As illustrated in FIG. 9, processing of target unstructured log data carried out by various log-based systems may be optimized by utilizing the log catalog (e.g., various log type template structure descriptors and/or log schema parameter specifications), which is generated by the automated log analysis and cataloging system 900 and stored in the log catalog storage 302 as one or more entries. Herein, the log processing device 303 may request the generated log type template structure descriptors and/or the log schema parameter specifications by sending the query. In the query, the log processing device 303 may include related information (e.g., type or characteristics of the unstructured log entries to be processed, input some samples of the log data to be processed, a timestamp for retrieving all updated and/or newly generated entries since the indicated time point) to facilitate a retrieval of the needed log type template structure descriptors and/or the log schema parameter specifications stored in the log catalog storage 302. In some examples, a tenant ID/customer identifier or tags may be attached to the entries that stored in the log catalog storage 302. This may allow the log processing device 303 to collect or retrieve all related entries with a corresponding identifier or tag. It is to be understood that various appropriate mechanisms may be employed for log processing device 303 to retrieve relevant entries stored in the log catalog storage 302. Herein, it is to be understood that a log processing device 303 may also be a device providing the source of the training log data 301.

At step 1002, responsive to the received query, the network traffic management apparatus 20 (e.g., the transceiver unit 240) may retrieve one or more entries stored in the log catalog storage 302. The retrieved one or more entries may include the log type template structure descriptors, the log schema parameter specifications, or both, which are needed by the log processing device 303.

At step 1003, the transceiver unit 240 may transmit the one or more retrieved entries which is stored in the log catalog storage 302 to the log processing device 303. As illustrated above, the retrieved one or more entries comprise the generated log type template structure descriptor, the log schema parameter specification, or both. With such log cataloging information, a log processing device 303 may learn the structure of relevant log data to be processed, how to extract a structure from the log data and how to organize the extracted structure (e.g., how to get a maximum compression rate, how to optimize the transportation or storage of the extracted structure). For example, with the retrieved log parser specification 9060 or based on the log type template structure descriptor, a log transport system as illustrated in FIG. 9 may derive regular expressions with groups to capture the values of parameters, thereby converting unstructured logs into structured logs. These structured logs can then be represented in a columnar format for better compression. As another example, the entropy metadata can be used to determine how to sort batches by the log processing device 303. As another example, a log storage system may derive table schemas and partitioning instructions with the log parser specification 9060 or based on the log type template structure descriptor retrieved from the log catalog storage. In this way, a processing of target unstructured log data by a log processing device 303 can be optimized by utilizing the log cataloging information (i.e., the generated log type template structure descriptors and/or the log schema parameter specifications), which are generated by a device implementing the operations in this disclosure (e.g., the network traffic management apparatus 20, the automated log analysis and cataloging system 900).

By implementing the operations discussed herein, meaningful log catalog information (i.e., log type template structure descriptors and the log schema parameter specifications) are obtained for each template. Accordingly, this exemplary process may generate effective log cataloging information based on unstructured data. A generated log cataloging information for a template and its parameters comprises a log schema parameter specification, which comprises a collection of schemas. Each schema is generated for each parameter that corresponds to a template. Accordingly, for a template that has a set of parameters, the same number of schemas are generated for this template, constituting the log schema parameter specification. Optionally, the generated log catalog may further comprise various statistics information. Moreover, in some examples, additional input may further facilitate a refine, annotate, or improve an accuracy of the generation of those log catalogs. For example, a set of preferred values of metrics may be specified by a user, which may guide the log catalog generation process. As another example, a user can optionally complete or override the specifications defined in the log catalog. As discussed above, the generated log catalog may be utilized by various log processing devices or systems to optimize the log processing of target unstructured log data.

Throughout the specification and claims, terms may have nuanced meanings suggested or implied in context beyond an explicitly stated meaning. It will be further understood that: the term "or" may be inclusive or exclusive unless expressly stated otherwise; the term "set" may comprise zero, one, or two or more elements; the terms "some", "another," and "particular" are used as naming conventions to distinguish elements from each other and does not imply an ordering, timing, or any characteristic of the referenced items unless otherwise specified; the terms "such as", "e.g.," "for example", and the like describe one or more examples but are not limited to the described examples(s); the term "comprises" and/or "comprising" specify the presence of stated features, but do not preclude the presence or addition of one or more other features.

Reference throughout this specification to features, advantages, or similar language does not imply that all of the features and advantages that may be realized with the present solution should be or are included in any single implementation thereof. Rather, language referring to the features and advantages is understood to mean that a specific feature, advantage, or characteristic described in connection with an example is included in at least one example of the present solution. Thus, discussions of the features and advantages, and similar language, throughout the specification may, but do not necessarily, refer to the same example.

Furthermore, the described features, advantages and characteristics of the present solution may be combined in any suitable manner in one or more implementations or examples. One of ordinary skill in the relevant art will recognize, in light of the description herein, that the present solution can be practiced without one or more of the specific features or advantages of a particular implementation or example. In other instances, additional features and advantages may be recognized in certain implementations or examples that may not be present in all implementations of the present disclosure.

What is claimed is:

1. A method, implemented by a network traffic management system comprising one or more network traffic management apparatuses, edge devices, client devices, or server devices, comprising:

receiving a query from a log processing device configured to process target unstructured log data, the target unstructured log data comprising information describing events that have occurred in a network, a network application, or a network device;

retrieving, responsive to the received query, one or more entries stored in a log catalog storage, wherein the one or more entries resulted from actions including:

extracting, from training log data, one or more templates and corresponding parameters, prompting a natural language processing model with the one or more templates and parameters to generate a log type template structure descriptor and a log schema parameter specification, and storing the log type template structure descriptor and the log schema parameter specification as the one or more entries in the log catalog storage; and transmitting the one or more retrieved entries to the log processing device.

2. The method of claim 1, the one or more entries are generated based on:

evaluating the one or more template and parameters to generate statistic information for one or more metrics, and storing the statistic information as one or more entries in the log catalog storage.

3. The method of claim 2, the one or more entries are generated based on:

repeating the prompting step based on the generated statistic information to refine the log type template structure descriptor and the log schema parameter specification generated previously, and storing the refined log type template structure descriptor and log schema parameter specification as one or more entries in the log catalog storage.

4. The method of claim 1, wherein the log type template structure descriptor is a log parser specification, and the retrieved one or more entries comprise one or more log parser specifications.

5. The method of claim 1, the one or more entries are generated based on:

receiving, via a graphical user interface, one or more preferred metric values specified by a user, and prompting the natural language processing model based on the one or more preferred metric values specified by the user.

6. An apparatus, comprising memory comprising programmed instructions stored in the memory and one or more processors configured to be capable of executing the programmed instructions stored in the memory to:

receive a query from a log processing device configured to process target unstructured log data, the target unstructured log data comprising information describing events that have occurred in a network, a network application, or a network device;

retrieve, responsive to the received query, one or more entries stored in a log catalog storage, wherein the one or more entries resulted from actions including:

extracting, from training log data, one or more templates and corresponding parameters, prompting a natural language processing model with the one or more templates and parameters to generate a log type template structure descriptor and a log schema parameter specification, and storing the log type template structure descriptor and the log schema parameter specification as the one or more entries in the log catalog storage; and transmit the one or more retrieved entries to the log processing device.

7. The apparatus of claim 6, the one or more entries are generated based on:

evaluating the one or more template and parameters to generate statistic information for one or more metrics, and storing the statistic information as one or more entries in the log catalog storage.

8. The apparatus of claim 7, the one or more entries are generated based on:

repeating the prompting step based on the generated statistic information to refine the log type template structure descriptor and the log schema parameter specification generated previously, and storing the refined log type template structure descriptor and log schema parameter specification as one or more entries in the log catalog storage.

9. The apparatus of claim 6, wherein the log type template structure descriptor is a log parser specification, and the retrieved one or more entries comprise one or more log parser specifications.

10. The apparatus of claim 6, the one or more entries are generated based on:

receiving, via a graphical user interface, one or more preferred metric values specified by a user, and prompting the natural language processing model based on the one or more preferred metric values specified by the user.

11. A non-transitory computer readable medium having stored thereon instructions, comprising executable code which when executed by one or more processors, causes the one or more processors to:

receive a query from a log processing device configured to process target unstructured log data, the target unstructured log data comprising information describing events that have occurred in a network, a network application, or a network device;

retrieve, responsive to the received query, one or more entries stored in a log catalog storage, wherein the one or more entries resulted from actions including:

extracting, from training log data, one or more templates and corresponding parameters, prompting a natural language processing model with the one or more templates and parameters to generate a log type template structure descriptor and a log schema parameter specification, and storing the log type template structure descriptor and the log schema parameter specification as the one or more entries in the log catalog storage; and transmit the one or more retrieved entries to the log processing device.

12. The non-transitory computer readable medium of claim 11, the one or more entries are generated based on:

evaluating the one or more template and parameters to generate statistic information for one or more metrics, and storing the statistic information as one or more entries in the log catalog storage.

13. The non-transitory computer readable medium of claim 12, the one or more entries are generated based on:

repeating the prompting step based on the generated statistic information to refine the log type template structure descriptor and the log schema parameter specification generated previously, and storing the refined log type template structure descriptor and log schema parameter specification as one or more entries in the log catalog storage.

14. The non-transitory computer readable medium of claim 11, wherein the log type template structure descriptor is a log parser specification, and the retrieved one or more entries comprise one or more log parser specifications.

15. The non-transitory computer readable medium of claim 11, the one or more entries are generated based on:

receiving, via a graphical user interface, one or more preferred metric values specified by a user, and prompting the natural language processing model based on the one or more preferred metric values specified by the user.

16. A network traffic management system, comprising one or more traffic management apparatuses, server devices, or client devices, the network traffic management system comprising memory comprising programmed instructions stored thereon and one or more processors configured to be capable of executing the stored programmed instructions to:

receive a query from a log processing device configured to process target unstructured log data, the target unstructured log data comprising information describing events that have occurred in a network, a network application, or a network device;

retrieve, responsive to the received query, one or more entries stored in a log catalog storage, wherein the one or more entries resulted from actions including:

extracting, from training log data, one or more templates and corresponding parameters, prompting a natural language processing model with the one or more templates and parameters to generate a log type template structure descriptor and a log schema parameter specification, and storing the log type template structure descriptor and the log schema parameter specification as the one or more entries in the log catalog storage; and transmit the retrieved one or more entries to the log processing device.

17. The network traffic management system of claim 16, the one or more entries are generated based on:

evaluating the one or more template and parameters to generate statistic information for one or more metrics, and storing the statistic information as one or more entries in the log catalog storage.

18. The network traffic management system of claim 17, the one or more entries are generated based on:

repeating the prompting step based on the generated statistic information to refine the log type template structure descriptor and the log schema parameter specification generated previously, and storing the refined log type template structure descriptor and log schema parameter specification as one or more entries in the log catalog storage.

19. The network traffic management system of claim 16, wherein the log type template structure descriptor is a log parser specification, and the retrieved one or more entries comprise one or more log parser specifications.

20. The network traffic management system of claim 16, the one or more entries are generated based on:

receiving, via a graphical user interface, one or more preferred metric values specified by a user, and prompting the natural language processing model based on the one or more preferred metric values specified by the user.

* * * * *